(12) United States Patent
Gajda et al.

(10) Patent No.: US 11,914,445 B2
(45) Date of Patent: Feb. 27, 2024

(54) MANAGEMENT OF POWER TO INTERNAL SUBSYSTEMS WITHIN A SYSTEM ON CHIP

(71) Applicant: Nordic Semiconductor ASA, Trondheim (NO)

(72) Inventors: Bartosz Gajda, Trondheim (NO); Frode Pedersen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 17/787,130

(22) PCT Filed: Dec. 18, 2020

(86) PCT No.: PCT/EP2020/087292
§ 371 (c)(1),
(2) Date: Jun. 17, 2022

(87) PCT Pub. No.: WO2021/123361
PCT Pub. Date: Jun. 24, 2021

(65) Prior Publication Data
US 2023/0064867 A1 Mar. 2, 2023

(30) Foreign Application Priority Data
Dec. 20, 2019 (GB) .................................. 1919050

(51) Int. Cl.
*G06F 1/32* (2019.01)
*G06F 1/3206* (2019.01)
*G06F 1/3296* (2019.01)
(52) U.S. Cl.
CPC .......... *G06F 1/3206* (2013.01); *G06F 1/3296* (2013.01)
(58) Field of Classification Search
None
See application file for complete search history.

(56) References Cited

U.S. PATENT DOCUMENTS

| 2004/0064747 | A1  | 4/2004 | Haider |
| 2009/0024856 | A1* | 1/2009 | Lee ................. G11C 16/30 |
| | | | 713/320 |

(Continued)

FOREIGN PATENT DOCUMENTS

| WO | WO 2016/130259 A1 | 8/2016 |
| WO | WO 2020/002555 A1 | 1/2020 |

OTHER PUBLICATIONS

IPO Search and Examination Report under Sections 17 and 18(3) for GB1919050.3, dated May 15, 2020, 6 pages.

(Continued)

*Primary Examiner* — Nitin C Patel
(74) *Attorney, Agent, or Firm* — Klarquist Sparkman, LLP

(57) ABSTRACT

An electronic device comprising a system on chip and an external module. The system on chip includes a plurality of internal subsystems and a power management system including a plurality of internal voltage regulators which supply power to the plurality of internal subsystems. Each of the internal voltage regulators has an associated current limiter. The external module includes at least one external voltage regulator which can provide power to at least one of the internal subsystems. The power management system during a start-up phase enables the internal voltage regulators and the current limiters and in a subsequent phase determines an externally powered set of the internal subsystems, disables the corresponding internal voltage regulators, and disables the current limiters associated with the internal subsystems not externally powered.

19 Claims, 3 Drawing Sheets

(56) References Cited

U.S. PATENT DOCUMENTS

2015/0378385 A1   12/2015  Rana et al.
2016/0048147 A1    2/2016  Abhishek et al.
2017/0351320 A1   12/2017  Nayak et al.

OTHER PUBLICATIONS

Further IPO Search and Examination Report under Sections 17 and 18(3) for GB1919050.3, dated Feb. 10, 2021, 5 pages.
International Search Report and Written Opinion for PCT/EP2020/087292, dated May 31, 2021, 23 pages.

* cited by examiner

MANAGEMENT OF POWER TO INTERNAL SUBSYSTEMS WITHIN A SYSTEM ON CHIP

CROSS REFERENCE TO RELATED APPLICATIONS

This is the U.S. National Stage of International Application No. PCT/EP2020/087292, filed Dec. 18, 2020, which was published in English under PCT Article 21(2), which in turn claims the benefit of Great Britain Application No. 1919050.3, filed Dec. 20, 2019.

This invention relates to power management systems in system on chip (SoC) arrangements, and particularly management of the power supplied to internal subsystems within the system on chip.

SoC's such as the Applicant's highly popular nRF series typically include a microprocessor, memory, and wireless communication functionality on a single integrated circuit. They are used in a large variety of portable electronic devices to provide compact, power efficient general purpose data handling and communication. In order to provide long battery life, an SoC will typically include a complex power management system which hosts and controls the various on-chip regulators associated with different power domains to ensure that power is only provided when absolutely necessary to meet the requirements of internal subsystems within the SoC.

High manufacturing costs of SoCs, particularly in the production of silicon wafers, make it desirable to manufacture a single design in large quantities as opposed to a variety of different SoCs. The Applicant has appreciated the necessity for a single SoC design capable of implementation in a number of different electronic devices serving different purposes. In particular the Applicant has now been recognised that in some circumstances developers designing products incorporating such an SoC may want to utilise one or more off-chip voltage regulators instead of one, some or all of the internally-provided voltage regulators, but that there may be difficulties in such arrangements, particularly during start-up of the SoC.

When viewed from a first aspect the invention provides an electronic device comprising:
a system on chip, including:
  a plurality of internal subsystems; and
  a power management system comprising a plurality of internal voltage regulators arranged to supply power to the plurality of internal subsystems, each of the internal voltage regulators having an associated current limiter; and
an external module comprising at least one external voltage regulator and connected to the system on chip such that the external voltage regulator can provide power to at least one of said internal subsystems on the system on chip, wherein the power management system is arranged during a start-up phase to enable said internal voltage regulators and said current limiters and in a subsequent phase to;
determine an externally powered set of the internal subsystems powered by the external voltage regulator(s);
disable one or more of said internal voltage regulators corresponding to said externally powered set of internal subsystems; and
disable one or more of said current limiters associated with the internal voltage regulators which correspond to the internal subsystems not in the externally powered set of internal subsystems.

Thus it will be seen by those skilled in the art that in accordance with the invention a great degree of flexibility may be provided as to which internal subsystems are powered internally and which are powered by an external regulator. Moreover the current limiters allow the device to be started up without knowing which internal subsystems are in which category whilst also avoiding the risk of excessive current flow between typically mismatched internal and external regulators when both are operational. This may avoid the need to provide any additional pins in order to provide information regarding the deployment of external regulators to the SoC.

By disabling the internal regulators for those internal subsystems which are powered externally, an overall power saving may be made. By disabling the current limiters corresponding to the internal regulators for those internal subsystems which are powered internally, the full capability of the internal regulator can be used which may be important in certain high power modes of operation. Whilst just some of the current limiters might be disabled, in a set of embodiments all current limiters are disabled. This may be automatic for those associated with voltage regulators which are disabled—e.g. because the current limiters are part of the voltage regulator.

After the initial start-up phase, the power management system determines which of the internal subsystems are powered externally. This could be achieved in a number of ways but in a set of embodiments the power management system is arranged to read configuration information regarding said externally powered set of internal subsystems from a non-volatile memory location. The subsequent phase may therefore be defined as after a point in the start-up sequence which is sufficiently stable that a processor of the SoC is able to read data from said non-volatile memory location. The non-volatile memory could be located on the SoC or could be located in a memory module off the SoC which is required for other functions in order to avoid the need for extra external connections/pins as mentioned above.

The SoC could be configured such that all of its internal voltage regulators can be bypassed by external regulators as described above. However this is not essential and it may be that only some or even only one can by bypassed in this way. The plurality of internal voltage regulators referred to herein should therefore be understood to refer to those internal voltage regulators which are designated during manufacture of the SoC as ones which can be bypassed in accordance with the invention, and not necessarily all voltage regulators present on the SoC.

In a set of embodiments the power management comprises a voltage monitoring portion. This may be used to determine when to move into the subsequent phase—e.g. when a voltage level from one or more of the internal regulators is stable.

In set of embodiments the current limiters are included within the corresponding voltage regulators. In a set of embodiments the current limiters each comprise a respective digital controller arranged to receive a digital input signal to enable or disable the current limiter. As will be appreciated, the digital input signal allows the current limiter to be controlled independently of the regulator's start-up sequence.

In a set of embodiments the SoC comprises a user interface to allow a user to store a regulator configuration in the non-volatile memory. This provides the flexibility mentioned above whereby the user can select how to use the SoC in their particular application.

The device may comprise a primary power source such as a battery. In a set of embodiments the primary power source is connected to the external module to provide power to the external voltage regulator(s) and directly to the SoC in order to provide power to the internal voltage regulator(s).

In a set of embodiments the SoC comprises at least one general purpose input/output (GPIO) module providing communication to at least one of said internal subsystems and powered by an external voltage regulator. The external voltage regulator could be the same as described above for bypassing internal voltage regulators, but in a set of embodiments it is distinct.

In a set of embodiments the power management system is arranged to determine whether said general purpose input/output module is powered and to control access to the general purpose input/output module to allow access to the GPIO module if it is determined to be powered. This is advantageous in allowing the safe use of the GPIO module. It allows a user to choose whether a GPIO module is powered or not in a given application. This may be beneficial for example in preventing leakage from GPIO modules which are unused in a given application. It may also allow dynamic power gating of a GPIO module at a given point of operation. This may be beneficial for example where an external peripheral such as external memory which is itself power gated is connected to the GPIO module.

Such an arrangement is novel and inventive in its own right and thus when viewed from a second aspect the invention provides an electronic device comprising:
  at least one external voltage regulator; and
  a system on chip, including:
    i) a plurality of internal subsystems;
    ii) a power management system comprising a plurality of internal voltage regulators arranged to supply power to the plurality of internal subsystems; and
    iii) at least one general purpose input/output module providing communication to at least one of said internal subsystems and powered by the external voltage regulator;
  wherein the power management system is arranged to determine whether said general purpose input/output module is powered and to control access to the general purpose input/output module to allow access if the general purpose input/output module is determined to be powered.

In a set of embodiments of either aspect of the invention the SoC comprises a plurality of GPIO modules. They may each be powered by separate respective external voltage regulators or some or all of them may share a common external voltage regulator.

In a set of embodiments the power management system is arranged to determine whether the or a given GPIO module is powered by monitoring a voltage level provided to the GPIO module. In another set of embodiments the power management system is arranged to determine whether the or a given GPIO module is powered by reading a status from a non-volatile memory location. This could be associated with the non-volatile memory location set out in accordance with the first aspect of the invention but this is not essential. Embodiments having both features are envisaged—i.e. the power management system could check for a definitive status in the non-volatile memory location and monitor the voltage provided to the GPIO module if no definitive status is given (e.g. no status is stored or the status indicates that the GPIO module can be dynamically changed).

In a set of embodiments the SoC comprises a user interface to allow a user to store a regulator configuration in the non-volatile memory. This provides the flexibility mentioned above whereby the user can select how to use the GPIO module(s) in their particular application. This user interface could be associated with the user interface set out in accordance with the first aspect of the invention but this is not essential The Applicant has also recognised that an SoC comprising internal voltage regulators can be used to provide power to devices circuit elements peripheral to the SoC using the internal voltage regulators. This may be beneficial in allowing a developer to design a device with low power peripherals such as sensors without having to provide external regulators.

In a set of embodiments the device comprises a peripheral external to the SoC and connected thereto for receiving power from one of the internal voltage regulators and the power management system comprises a power gate arranged to limit or prevent current flow from said internal voltage regulator to said peripheral when said internal voltage regulator is in a low power mode.

Such embodiments may provide the advantage set out above, without suffering from the potential drawback to this which might arise should such a peripheral try to draw current from the internal voltage regulator when the internal voltage regulator is in a low power mode such as a sleep mode. This could be detrimental to the performance of other parts of the SoC, not just the peripheral.

In a set of such embodiments the power gate is also arranged to limit or prevent the current flow from said internal voltage regulator to said peripheral (i.e. to close the power gate) when the power management system is in the start-up phase.

Whilst this could be provided where one or more external regulators replace internal regulators in accordance with the first aspect of the invention, it will be appreciated by those skilled in the art that it is likely to be of more benefit where there may not be any suitable external regulators. Such an arrangement is novel and inventive in its own right and thus when viewed from a third aspect the invention provides an electronic device comprising:
  a system on chip, including:
    a plurality of internal subsystems; and
    a power management system comprising a plurality of internal voltage regulators arranged to supply power to the plurality of internal subsystems, wherein at least one of the internal voltage regulators is an externally available regulator and is connected to a connection terminal via a power gate;
  an external peripheral connected to said connection terminal so as to receive power from the externally available regulator;
  wherein the power management system is arranged to control the power gate to limit or prevent current flow to the peripheral when the externally available regulator is in a low power state.

In a set of embodiments the power gate is arranged to be controllable from a user application running on the SoC. This allows a user to use the power gate to control power to the peripheral as part of running an application—e.g. to prevent leakage of power to the peripheral when it is not being used.

In a set of embodiments the power management system is arranged to increase the amount of power provided by the externally available internal voltage regulator when the power gate is open.

In a set of embodiments the SoC includes a radio transmitter and/or receiver to enable wireless data transfer—e.g. using Bluetooth™, WiFi, LTE or the like.

Certain embodiments of the invention will now be described, by way of example only, with reference to the accompanying drawings in which.

Figure 1:
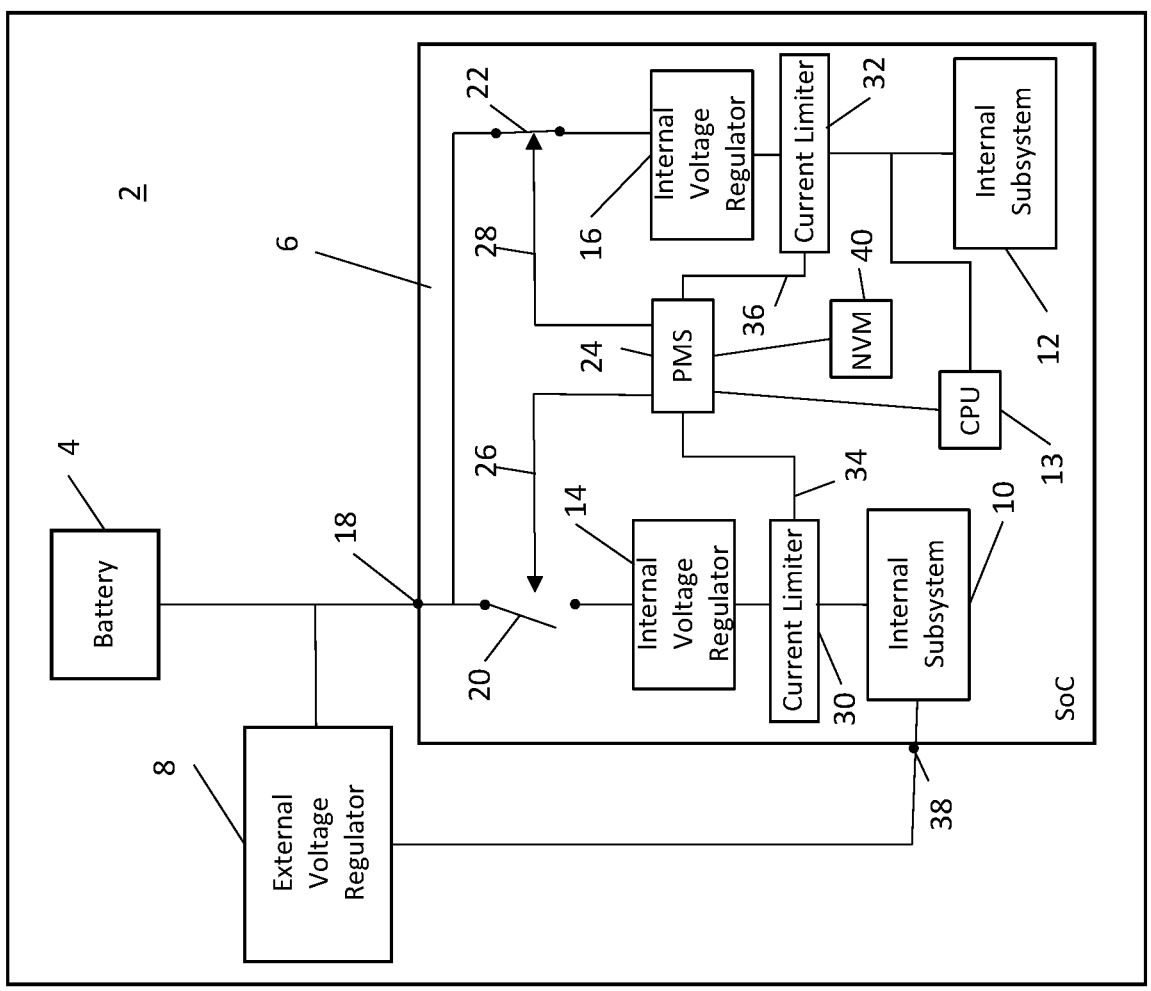
FIG. 1 is a schematic system diagram of an electronic device in accordance with a first embodiment of the invention.

FIG. 1 shows schematically an electronic device 2 which could be any of a wide range of devices and includes a battery 4 to power the device, a system on chip (SoC) 6, described in more detail below, and an external voltage regulator 8. As will be seen the battery 4 is connected to the SoC 6 to provide power to it, but also to the external voltage regulator 8 which produces a regulated DC voltage that is supplied separately to the SoC 6.

The SoC 6 comprises a large number of different modules, most of which are standard and omitted for clarity. However they might typically include radio transmitter and receiver modules, a central processing unit, random access memory, clock sources etc. FIG. 1 shows for illustration two internal subsystems 10, 12 and a central processing unit (CPU) 13 although of course in practice many more would typically be provided. These could be any of the things mentioned above or any other type of subsystem.

The first internal subsystem 10 is in a power domain supplied by a first internal voltage regulator 14. The second internal subsystem 12 and the CPU 13 are in a different power domain supplied by the second internal voltage regulator 16. The internal voltage regulators 14, 16 are powered by the battery 4 via an external power connection 18. The internal voltage regulators 14, 16 are controlled by respective switches 20, 22 which are in turn controlled by a power management system (PMS) 24 by means of control signals 26, 28. It should be understood that whilst external switches 20, 22 are depicted for the purpose of explanation, these could in practice be an integral part of the respective internal voltage regulators 14, 16—e.g. the internal voltage regulators 14, 16 could be arranged to have a control input by which they can be enabled or disabled.

Between each of the internal voltage regulators 14, 16 and the associated internal subsystems 10, 12, 13 are respective current limiters 30, 32—the detailed configuration of which is not shown but many possibilities are known in the art. These are configured to limit current flowing through them to no more than 10 mA for example. The current limiters 30, 32 are also controlled by the PMS 24 by means of control signals 34, 36 either to enable a given current limiter or to disable it—i.e. to allow current to flow through the current limiter 30, 32 without limiting it. As with the switches, it should be understood that whilst external current limiters 30,32 are depicted for the purpose of explanation, these could in practice be an integral part of the respective internal voltage regulators 14, 16—e.g. the internal voltage regulators 14, 16 could be arranged to have a control input by which the corresponding current limiters can be enabled or disabled.

In the illustrative embodiment shown in FIG. 1, one of the internal subsystems 10 is also connected to the external voltage regulator 8 via a further external power connection 38. Alternatively the external voltage regulator could be connected to a pin used to connect an external decoupling capacitor to the corresponding internal voltage regulator. This facility provides flexibility to a designer designing a device employing the SoC 6 to decide whether to use just the internal voltage regulators built into the SoC 6 or whether to expand these by providing their own voltage regulators which are off-chip. This therefore allows the designer to use a regulator which has better performance for a particular application or which may be required anyway for other off-chip peripherals (not shown).

Also shown in FIG. 1 is that the PMS 24 is connected to a non-volatile memory 40 and to the CPU 13. In practice such connections are typically by means of a bus.

Operation of the embodiment of FIG. 1 will now be described. During an initial start-up phase the SoC 6 is powered—e.g. by closing a switch (not shown) between it and the battery 4—and the switches 20, 22 are closed by provide corresponding default control signals 26, 28 to them. At this stage the PMS 24 does not know which of the internal subsystems 10, 12, 13 are powered by external voltage regulators and which aren't. Although this information is stored in the non-volatile memory 40, in the initial stage of the start-up sequence the system is not in a sufficiently stable position for this to be read. As a precaution therefore, the current limiters 30, 32 are enabled on start-up. This could be achieved by providing suitable default control signals 34, 36. For any of the subsystems 10 which are powered externally, the current limiter 30 ensures that there is not too high a current flow as a result of the internal regulator 14 and the external regulator 8 trying to 'regulate against each other'. The external voltage regulator does however provide power in addition to the internal regulator during start-up which may be beneficial.

Once the internal voltage regulators 14, 16 are stable, the CPU 13 sends a signal to the PMS 24 which indicates that the initial start-up phase has finished and the subsequent phase of the start-up can begin. This causes the PMS 24 to retrieve the power rail configuration information from the non-volatile memory 40 previously stored by the designer of the device 2—e.g. by means of a convenient user interface or API. The PMS 24 thus learns that the first power domain 10 is powered by an external regulator 8 and thus the corresponding internal voltage regulator 14 can be disabled. The PMS 24 therefore sends a control signal 26 to open the corresponding switch 20. This ensures that the internal voltage regulator 14 does not consume any further current.

The PMS 24 also learns that the other power domain 12, 13 mentioned above is not powered externally and thus there is no need to limit current flowing into or out of the corresponding internal voltage regulator 16. The PMS 24 thus sends a suitable control signal 36 to disable the current limiter 32 associated with that regulator 16. This allows the full design amount of current to flow which thus enables all normal operation.

Although in this embodiment the power rail configuration (i.e. which power domains are externally regulated) is pre-stored during production of configuration of the device 2, it is also envisaged that this could be determined dynamically by the SoC—e.g. by use of voltage monitors.

Figure 2:
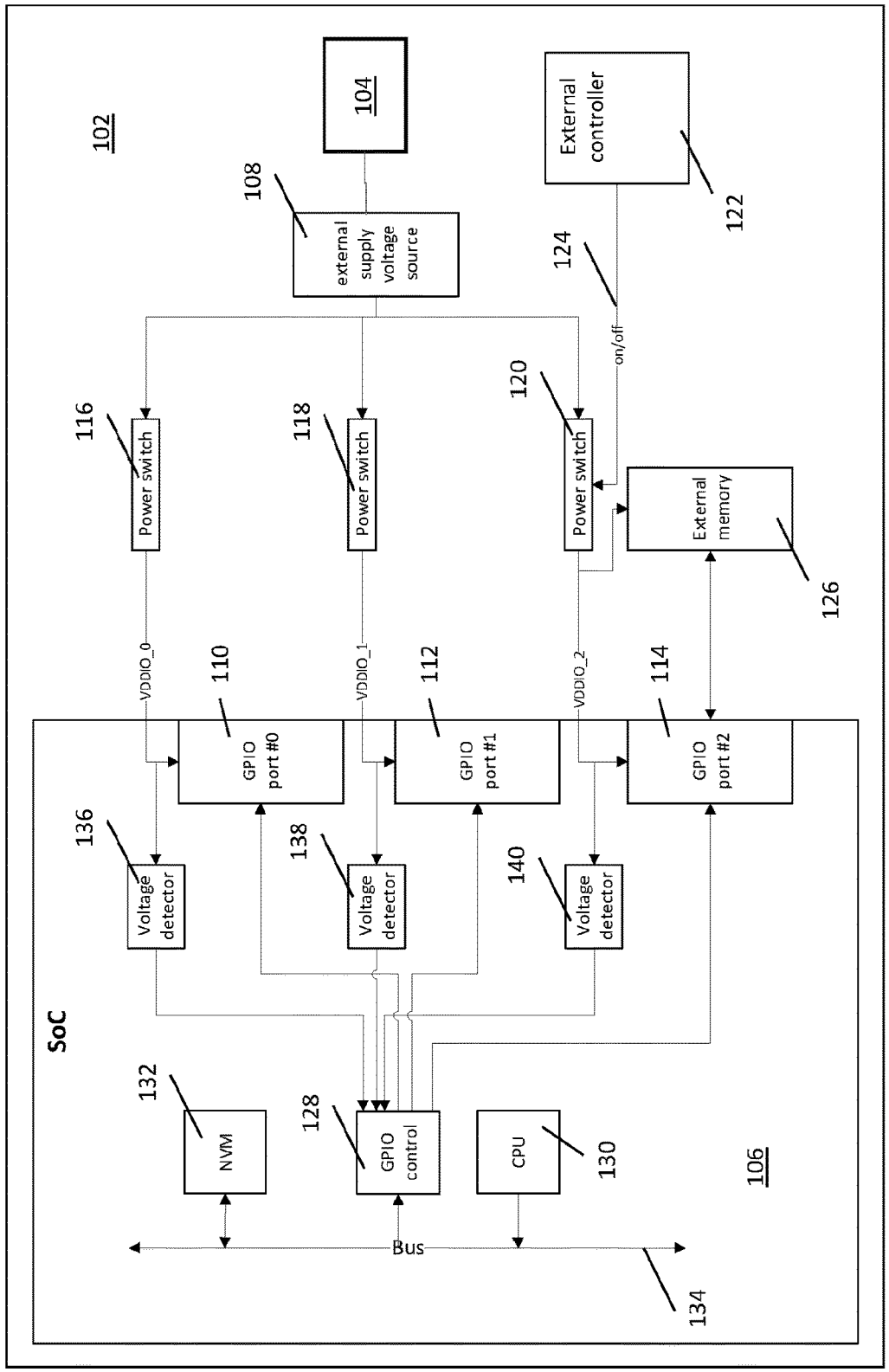
FIG. 2 is a schematic system diagram of an electronic device in accordance with a second embodiment of the invention.

FIG. 2 shows an embodiment of another aspect of the invention. In this embodiment an electronic device 102 comprises a battery 104 and an SoC 106. It also includes an external voltage regulator 108 powered by the battery 104. The external voltage regulator 108 is connected to a number of general purpose input-output (GPIO) modules 110, 112, 114 on the SoC 106 via respective power switches 116, 118, 120. The power switches 116, 118, 120 are controlled by an external controller 122 via control signals 124 (only one of which is shown for clarity purposes). One of the power switches 120 also controls power to an external memory 126 provided on the device 102 which is connected to the same GPIO module 114 as the power switch 120.

Inside the So6 106, a GPIO controller 128, a CPU 130 and a non-volatile memory 132 are connected by a common bus 134. The GPIO controller 128 controls access to the respective GPIO modules 110, 112, 114. Voltage detectors 136, 138, 140 monitor the voltage levels of the power rails of the respective GPIO modules 110, 112, 114 and report this to the GPIO controller 128.

In operation the GPIO controller 128 reads from the non-volatile memory 132 via the bus 134 which of the GPIO modules 110, 112, 114 are supposed to be permanently active, which are supposed to be permanently disabled and which are active/disabled dynamically. For any of the GPIO modules 110, 112, 114 determined to be permanently active (for which the corresponding external power switch 116, 118, 120 should be always closed), the GPIO controller 128 allows access for that GPIO module to the rest of the SoC 106—e.g. including the CPU 130. For any of the GPIO modules 110, 112, 114 determined to be permanently disabled (for which the corresponding external power switch 116, 118, 120 should be always open), the GPIO controller 128 prevents access for that GPIO module to the rest of the SoC 106. This avoids the risk of problems such as spurious signals arising from attempting to use a GPIO module which is not adequately powered.

For any of the GPIO modules determined to be dynamically active or disabled (for which the corresponding external power switch 116, 118, 120 may be open or closed depending on the operational state)—e.g. the lowermost GPIO module 114, the GPIO controller 128 activates the corresponding voltage detector 140 so that it can determine whether the corresponding power switch 120 is open or closed. If it is closed (and thus the GPIO module 114 is powered), the GPIO controller 128 allows access for the GPIO module 114 to the rest of the SoC 106, e.g. including the CPU 130. If the power switch 120 is open (and thus the GPIO module 114 is not powered), the GPIO controller 128 prevent access for the GPIO module 114 to the rest of the SoC 106.

The state of the power switch 120 is controlled by the external controller 122 which determines whether the external memory 126 connected to the GPIO module 114 is powered or not. Thus the external controller 122 can be used to power-gate the external memory 126 and the GPIO module 114 it uses which enables power saving when the memory 126 is not required whilst ensuring that the GPIO module 114 does not produce any spurious signals, nor act to leak current—e.g. during sleep mode of the SoC 106.

It will be appreciated that the embodiment described above allows for flexible installation of the SoC in a wide variety of different applications which have differing needs for GPIOs whilst saving power and protecting the SoC from damage or other adverse effects.

Figure 3:
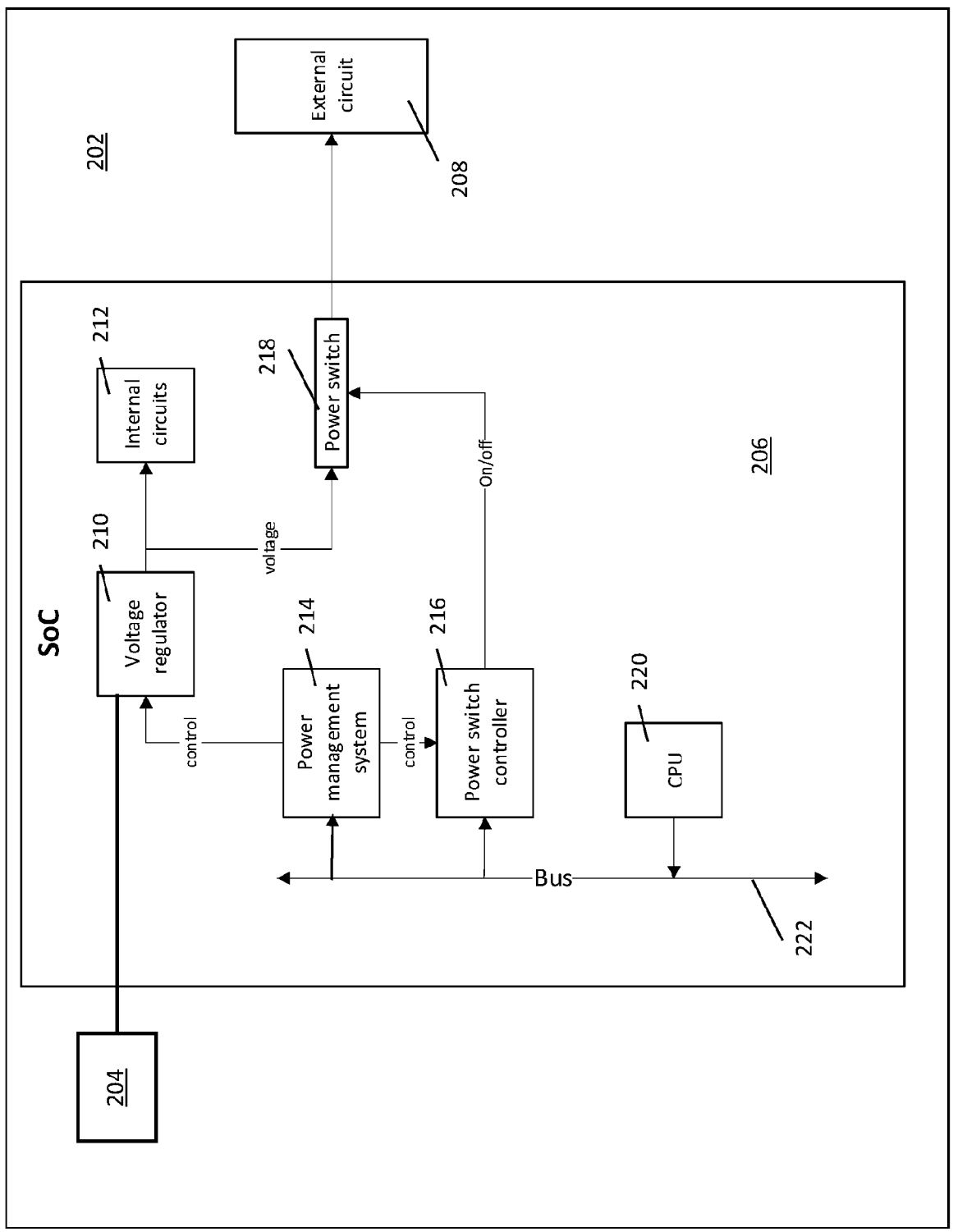
FIG. 3 is a schematic system diagram of an electronic device in accordance with a third embodiment of the invention.

FIG. 3 shows an embodiment of another aspect of the invention disclosed herein. In this embodiment an electronic device 202 comprises a battery 204, an SoC 206 and an external peripheral circuit 208 such as a sensor device.

The battery 204 is connected to an internal voltage regulator 210 on the SoC 206. In practice there would typically be many such regulators to power different respective power domains. The internal voltage regulator 210 powers an internal subsystem 212, although again there would typically be many of these. The internal voltage regulator 210 is controlled by a power management system (PMS) 214 which also controls a power switch controller 216 which in turn controls a power switch 218 that provides an external connection between the voltage regulator 210 and the external peripheral circuit 208. The voltage regulator 210 can therefore be considered to be an externally-available regulator. Other externally-available regulators could be provided as well and regulators which are not available externally could be provided.

The PMS 214 and the power gate controller 216 are connected to a CPU 220 by a bus 222.

In operation the external peripheral circuit 208 can be powered by the internal voltage regulator 210 which obviates the need to provide an off-chip voltage regulator external to the SoC 206 which may save on the bill of materials and allow a more compact design of the device 202 as a whole. The CPU 220 is typically aware that such an external circuit 208 is being used and so signals this to the PMS 214 which ensures that the voltage regulator 210 is operated in a mode which can supply additional current.

If, during operation, the PMS 214 chooses to put the voltage regulator 210 into a low power sleep mode, it issues a control signal to the power switch controller 216 to open the power switch 218 to prevent the external circuit 208 drawing current. This can avoid adverse consequences for the SoC 206 as a whole which would otherwise arise. Application software running on the CPU may be written to accommodate this situation. When the PMS wakes up the regulator 210, it also signals this to the power switch controller 216 which can then close the power switch 218 and restore power to the external circuit 208.

Separately from the above, the user software application can issue a command to the power switch controller 216 to close the power switch 118, thereby allowing the user to power-gate the external circuit—e.g. to save power. The user software application can also issue a control signal to re-close the power switch 218 but this cannot override a control signal form the PMS 214 to open it.

Thus it will be seen that this embodiment provides a simple way to allow an SoC to power external circuits, potentially with power-gating, whilst mitigating the risk of problems caused by too much current being drawn—e.g. while the internal voltage regulator is an a low power mode.

Although the various features of the foregoing embodiments have been shown implemented in separate devices, the Applicant envisages that a single device having any features of any two or all three of these embodiments could be provided. Other variants and modifications will also be apparent to the skilled person such that the invention is not limited to any of the described embodiments.

The invention claimed is:

1. An electronic device comprising:
a system on chip, including:
a plurality of internal subsystems; and
a power management system comprising a plurality of internal voltage regulators arranged to supply power to the plurality of internal subsystems, each of the internal voltage regulators having an associated current limiter; and
an external module comprising at least one external voltage regulator and connected to the system on chip such that the external voltage regulator can provide power to at least one of said internal subsystems on the system on chip, wherein the power management system is arranged during a start-up phase to enable said internal voltage regulators and said current limiters and in a subsequent phase to:
determine a first set of the internal subsystems powered by the external voltage regulator(s) and a second set of the internal subsystems not powered by the external voltage regulator(s);
disable one or more of said internal voltage regulators corresponding to the first set of internal subsystems; and
disable one or more of said current limiters associated with the internal voltage regulators which correspond to the second set of internal subsystems.

2. The electronic device as claimed in claim 1 wherein the power management system is arranged to read configuration information regarding said first set of internal subsystems from a non-volatile memory location.

3. The electronic device as claimed in claim 2 wherein the subsequent phase is after a point a start-up sequence which is sufficiently stable that a processor of the SoC is able to read data from said non-volatile memory location.

4. The electronic device as claimed in claim 2 wherein the system on chip comprises a user interface to allow a user to store a regulator configuration in the non-volatile memory.

5. The electronic device as claimed in claim 1 wherein the power management comprises a voltage monitoring portion.

6. The electronic device as claimed in claim 1 wherein the current limiters are included within the corresponding voltage regulators.

7. The electronic device as claimed in claim 1 wherein the current limiters each comprise a respective digital controller arranged to receive a digital input signal to enable or disable the current limiter.

8. The electronic device as claimed in claim 1 comprising a primary power source connected to the external module to provide power to the external voltage regulator(s) and directly to the system on chip in order to provide power to the internal voltage regulator(s).

9. The electronic device as claimed in claim 1 wherein the system on chip comprises at least one general purpose input/output module providing communication to at least one of said internal subsystems and powered by an external voltage regulator.

10. The electronic device as claimed in claim 9 wherein the power management system is arranged to determine whether said at least one general purpose input/output module is powered and to control access to the at least one general purpose input/output module to allow access to the GPIO module if the at least one general purpose input/output module is determined to be powered.

11. The electronic device as claimed in claim 9 wherein the system on chip comprises a plurality of general purpose input/output modules.

12. The electronic device as claimed in claim 9 wherein the power management system is arranged to determine whether said at least one general purpose input/output module is powered by monitoring a voltage level provided to the at least one general purpose input/output module.

13. The electronic device as claimed in claim 9 wherein the power management system is arranged to determine whether said at least one general purpose input/output module is powered by reading a status from a non-volatile memory location.

14. The electronic device as claimed in claim 13 wherein the system on chip comprises a user interface to allow a user to store a regulator configuration in the non-volatile memory.

15. The electronic device as claimed in claim 1 comprising a peripheral external to the system on chip and connected to the system on chip for receiving power from one of the internal voltage regulators and the power management system comprises a power gate arranged to limit or prevent current flow from said internal voltage regulator to said peripheral when said internal voltage regulator is in a low power mode.

16. The electronic device as claimed in claim 15 wherein the power gate is also arranged to limit or prevent the current flow from said internal voltage regulator to said peripheral when the power management system is in the start-up phase.

17. The electronic device as claimed in claim 15 wherein the power gate is arranged to be controllable from a user application running on the system on chip.

18. The electronic device as claimed in claim 15 wherein the power management system is arranged to increase the amount of power provided by the externally available internal voltage regulator when the power gate is open.

19. The electronic device as claimed in claim 1, wherein the system on chip includes a radio transmitter and/or receiver to enable wireless data transfer.

* * * * *